United States Patent [19]

Gates

[11] 4,148,645
[45] Apr. 10, 1979

[54] METHODS OF STEREO RELIEF MODELING

[76] Inventor: Jackson Gates, P. O. Box 145, Kylertown, Pa. 16847

[21] Appl. No.: 759,159

[22] Filed: Jan. 13, 1977

Related U.S. Application Data

[63] Continuation-in-part of Ser. No. 557,612, Mar. 12, 1975, Pat. No. 4,005,932.

[51] Int. Cl.² ............... G03C 11/00; G03B 21/00; B44C 3/00; B29C 1/02
[52] U.S. Cl. ............................ 96/46; 33/1 A; 156/58; 156/59; 264/40.1; 264/553; 264/219; 264/316; 353/7; 353/121; 355/22; 356/2
[58] Field of Search ............. 264/89, 90, 92, 93, 264/40.1, 219, 220, 316; 353/121, 7, 5, 6; 96/46; 33/1 A; 156/58, 59; 350/117; 355/22; 356/2

[56] References Cited

U.S. PATENT DOCUMENTS

| 2,309,752 | 2/1943 | Cooke | 356/2 X |
| 3,763,296 | 10/1973 | Burrows | 96/46 X |
| 3,894,802 | 7/1975 | Higgins | 350/132 X |

*Primary Examiner*—Jan H. Silbaugh
*Attorney, Agent, or Firm*—J. Rodman Steele, Jr.

[57] ABSTRACT

A stereo relief modelling apparatus based on photogrammetric method and apparatus comprising a flexible platen, used with standard stereo plotting instrumentation such as double-projection direct-viewing plotting instruments. The purpose of the flexible platen is to provide an absolute stereo image for photographic, modelling and other purposes. The flexible platen, which is of sufficient size to provide a meaningful mapping surface, is vertically adjustable at a multiplicity of points by mechanical, pneumatic, electro-mechanical, fully automated, or other means to provide an actual model-like three-dimensional photographic or modelling surface to enable relief distortion from aerial photographs to be effectively eliminated in planimetric photographs which are taken of the adjusted flexible platen, or models molded on the adjusted flexible platen, upon which the aerial images are projected. Modelling is facilitated by situating the platen inside a sealable vacuum box from which the air is removable.

In another embodiment, a computer system may be utilized with the stereo modelling apparatus to provide stereo or three-dimensional relief maps of mathematical functions generated by such system.

18 Claims, 12 Drawing Figures

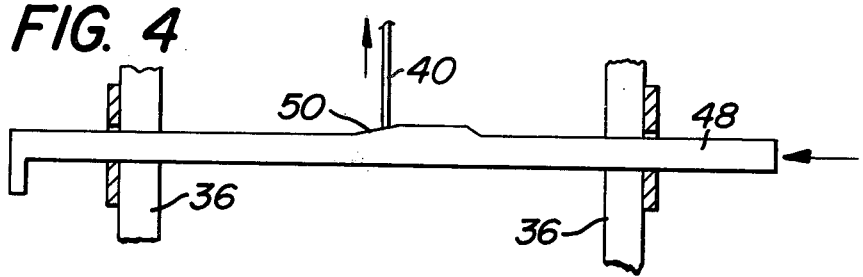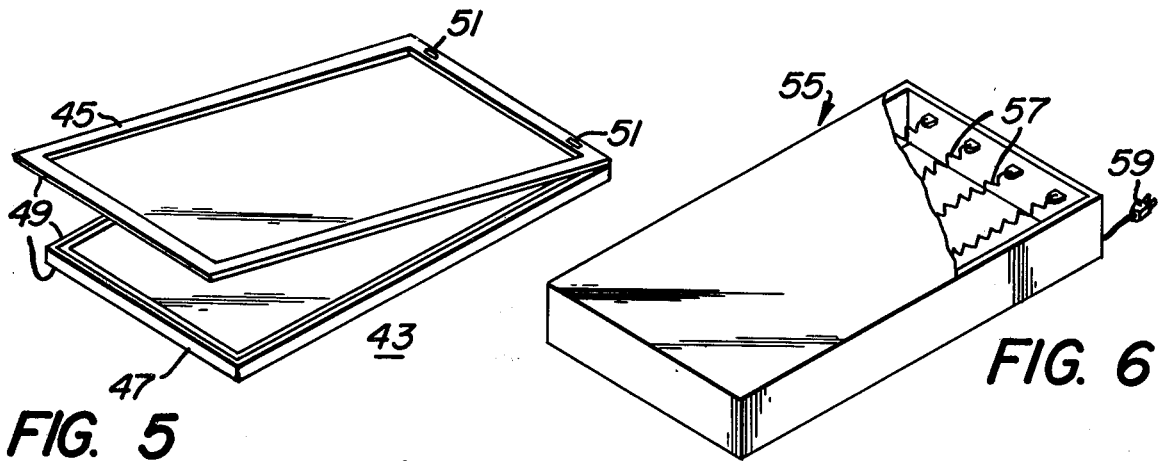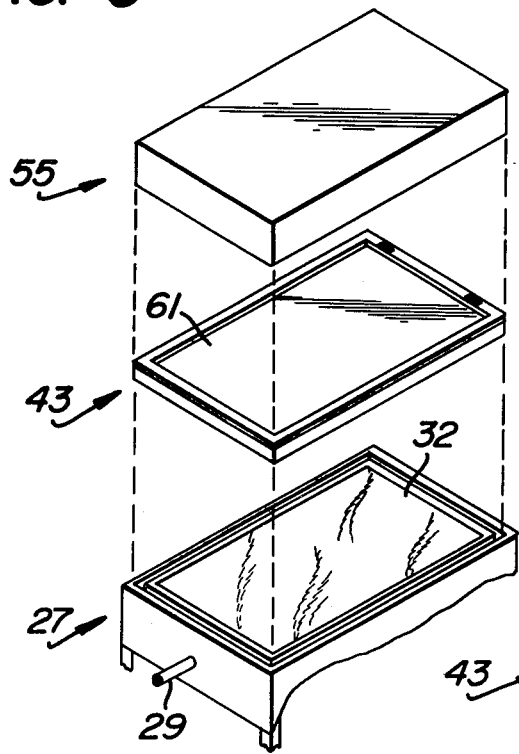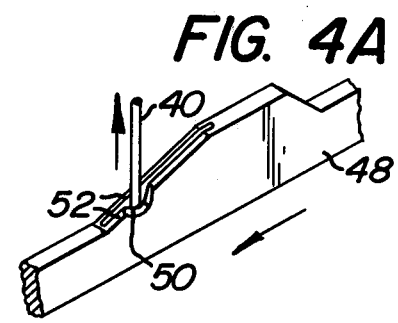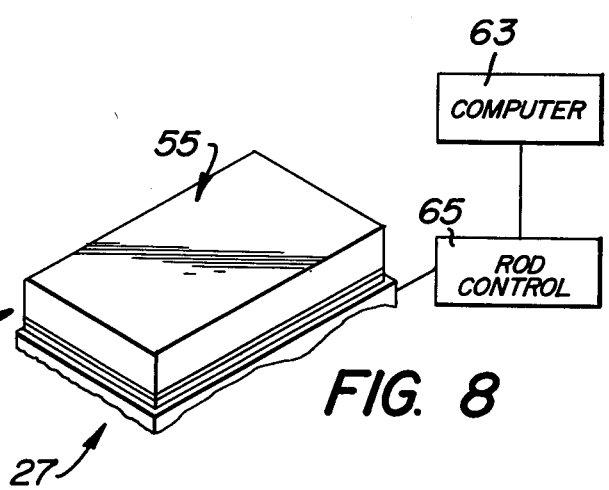

METHODS OF STEREO RELIEF MODELING

CONTINUATION-IN-PART APPLICATION

This is a continuation-in-part application of my co-pending application, Ser. No. 557,612, filed Mar. 12, 1975, now U.S. Pat. No. 4,005,932, entitled, "PHOTOGRAMMETRIC APPARATUS, METHODS OF USE AND PRODUCTS PRODUCED THEREBY".

BACKGROUND OF THE INVENTION

1. Field of the Invention

In the art of stereo or three-dimensional relief modelling, such models are produced from flat maps, wherein mountains and other natural terrain features having vertical extent are depicted by such means as contour lines. Contour maps are in turn produced by surveys or from aerial photographs which have been subjected to photogrammetric processing and stereo map plotting.

Stereo relief models are utilized for planning purposes or otherwise in many fields, including but not limited to general survey work and map making, road construction, erosion control, flood control and mining operations.

Further, by utilizing the apparatus and techniques of the subject invention, actual stereo relief models of mathematical functions may be constructed and utilized for research and teaching purposes or otherwise.

2. Prior Art

There are numerous known methods of producing three-dimensional map models of natural terrain features having vertical extent. A preferred method is to use a machine known as a contour pantograph.

The tracing stylus of this pantograph is caused to move in a groove which is the contour line of an etched zinc contour plate. This contour plate must, itself, be constructed from a contour map or other stereo plotting techniques. The follower stylus is in reality a revolving power driven cutter which may be height-adjusted to correspond to any given contour line on the contour plate. The follower stylus cuts into a block of laminated plastic sheets, each of which represents one contour interval. The result is a stepped arrangement on the laminated sheet, which is thereafter filled in with modelling clay so as to represent the terrain as it actually is, rather than by the stepped arrangement. In filling in the stepped contour, unavoidable errors occur.

In addition to the errors which are inherent in the modelling processes currently available, a great amount of time is required to make the contour map, prepare the contour plate, cut the laminated block and finally fill in the contoured steps with clay.

A flexible platen, which can be vertically adjusted at a plurality of surface points, as fully disclosed herein and in my co-pending application Ser. No. 557,612, filed on Mar. 12, 1975, now U.S. Pat. No. 4,005,932, entitled, "Photogrammetric Apparatus, Methods of Use, and Products Produced Thereby", is utilized with suitable conformable materials to form a surface upon which permanent stereo relief models may be molded.

Once the flexible platen has been properly adjusted, as taught in said co-pending application, accurate permanent stereo relief maps may be produced in a matter of minutes.

SUMMARY OF THE INVENTION

It is an object of the subject invention to provide improved means in the preparation of permanent stereo relief maps prepared from aerial photographs.

It is another object of the subject invention to provide permanent stereo relief maps in which, while high accuracy is maintained, production time largely due to extensive manual plotting is reduced by eliminating the necessity of plotting.

It is still another object of the subject invention to provide permanent stereo relief maps, in which, while high accuracy is maintained, production time largely due to hand operated machine carving operations such as a contour pantograph, is reduced by eliminating the necessity of using a contour pantograph.

It is yet another object of the subject invention to provide permanent stereo relief maps which display actual aerial photographs in three-dimensional relief.

It is one more object of the subject invention to provide permanent stereo relief maps of any mathematical function when utilized with a computer system capable of generating mathematical functions wherein one dependent variable is determinable from two independent variables.

A large, flexible platen, fully disclosed in my co-pending application Ser. No. 557,612, filed Mar. 12, 1975, now U.S. Pat. No. 4,005,932, entitled, "PHOTOGRAMMETRIC APPARATUS, METHODS OF USE AND PRODUCTS PRODUCED THEREBY", is used as a mapping surface for eliminating relief distortion in the preparation of planimetric and topographic maps prepared from aerial photographs. The need for a standard tracing table below the platen is eliminated as the corrected image is formed into a three-dimensional model which can then be photographed, modelled or otherwise used to advantage. The flexible platen apparatus is provided with the means of vertically aligning the flexible platen throughout so that the corrected image from the two diapositives (when a double-projection system is used) is achieved throughout the system at every point of adjustment. The vertical adjustment capability can be by mechanical, pneumatic, light-seeking, electro-mechanical or other means in which, at each designated point, the operator has the capability of raising that particular part of the flexible platen. For example, vertical rods may be placed at one-half inch intervals in a grid pattern with the rods being raised and lowered by horizontal connecting levers having motion translation means such as cam surfaces. Thus, the operator can adjust the points by moving the horizontal levers which extend along at least one side of the flexible platen model. Standard techniques may otherwise be used and the correct elevation be achieved when the red and blue-green images are seen to coincide to form the necessary bluish-red combination.

Accordingly, the flexibility of the platen, which may be of rubber construction or the like, permits it to match the actual terrain conditions to produce the stereo image and provide accurate control. Once the stereo image is correctly produced, instead of creating the image below on paper or other means such as film or the like, an overall three-dimensional actual model is created. Once the projected image is achieved, it is used as a mold for producing permanent three-dimensional stereo relief models.

In one method, a soft fluid material is applied to the flexible platen, which material has the characteristic of being solidifiable. Upon solidification, said material forms a permanent stereo relief model.

For the purposes of another method, the flexible platen is situated inside a sealable vacuum box from which the air is removable. A top or lid to the vacuum box is formed by placing a sheet of flexible, stretchable material, which material has the characteristic of becoming soft conformable when heat is applied, and which retains any shape assumed when said heat is removed, into a frame holder which is clamped to the vacuum box. When the air is removed from the vacuum box and the stretchable material is heated by a cover apparatus which fits over the material, the material becomes soft and is pulled downward onto the flexible platen conforming and molding exactly to its shape. Air flow means through or around the flexible platen are provided. The vacuum created in the vacuum box prevents air bubbles from being trapped between the material and the flexible platen, which bubbles would otherwise distort the material's shape. When the vacuum source and heating apparatus are deactivated, the material hardens into a permanent stereo relief model.

In still another process, the material used to form the model has the additional characteristic of being photosensitive, by being coated with a photosensitizer. The process is the same as the foregoing but the steps must be completed under conditions which will not prematurely expose the photosensitive material, such as the red safe light used in photographic developing laboratories. After the molding process, the vacuum box is placed back into the stereo map plotter, which was originally used to adjust the surface of the flexible platen, and the images which were used to adjust the flexible platen are re-exposed onto the photosensitive material. This material is removed from the frame holder and developed in the normal fashion. In the case of geographical applications, the result is a stereo or three-dimensional map of the terrain photograph.

In another embodiment disclosed herein, a computer system used in conjunction with the platen apparatus and the vacuum box provides a means for producing three-dimensional or stereo relief maps of any mathematic function wherein one dependent variable is determinable from two independent variables.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 4 illustrates a single lever mechanism used for the vertical adjustment of the flexible platen;

FIG. 4A is a close-up perspective view of the operational cam adjusting surface of the lever of FIG. 4;

FIG. 5 is a perspective view of the frame holder;

FIG. 6 is a perspective view in partial break-away of the cover and heating means;

FIG. 7 is a perspective view of the method in which the cover, the frame holder and the modified flexible platen apparatus are attached;

FIG. 8 is a schematic view of a computer controlled function generating system which may be utilized in conjunction with a flexible platen;

DETAILED DESCRIPTION

Figure 1:
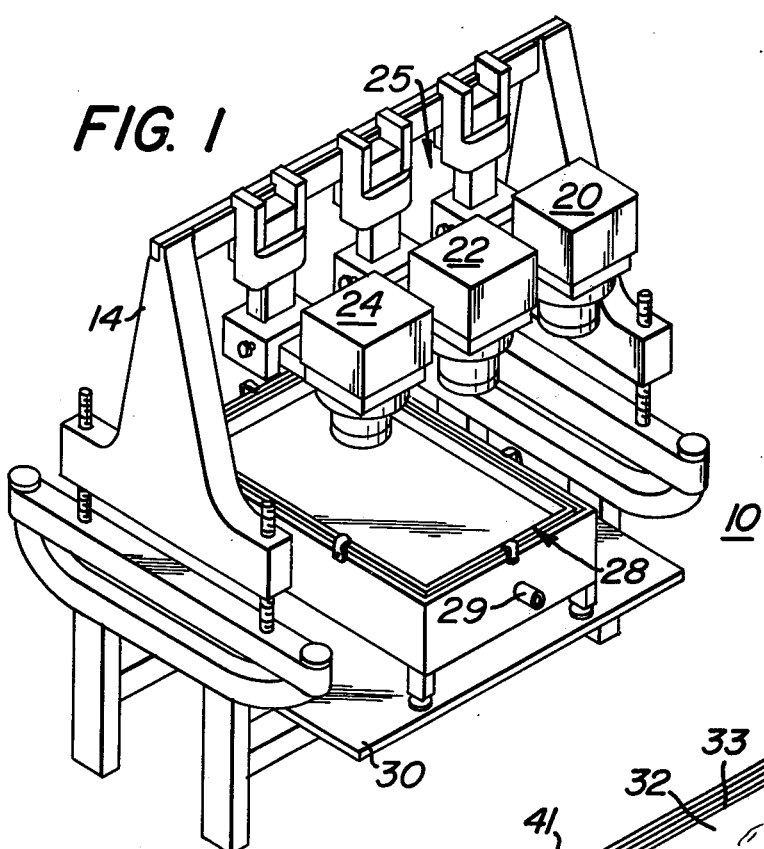
FIG. 1 is a perspective view illustrating the photogrammetric stereo map plotting system of the subject invention.

With reference to FIG. 1, a stereo map plotter 10 is disclosed having base frame members 12 which support projector frame structure 14 and which is adjustable by threadable adjustment means 16. The horizontal member 18 of the projector frame structure carries three projectors 20, 22 and 24, any two of which may be utilized at a time, to illuminate and project images from a pair of diapositives to the space below the projectors.

Each of the projectors 20, 22 and 24 is provided with rotational and linear translational motions to achieve the same orientation of the projectors as the aerial cameras from which the dispositives were produced. Thus, the projector mounts schematically shown as 25 are therefore constructed so that each projector 20, 22 and 24 may be rotated about each of three mutually perpendicular axes. While double-projection direct-viewing projectors such as the popular multiplex type of projectors may be used, the subject invention is not to be construed as being limited to this type of projection system.

The flexible platen apparatus is designated generally as 28 and is supported by lower support member 30.

Figure 2:
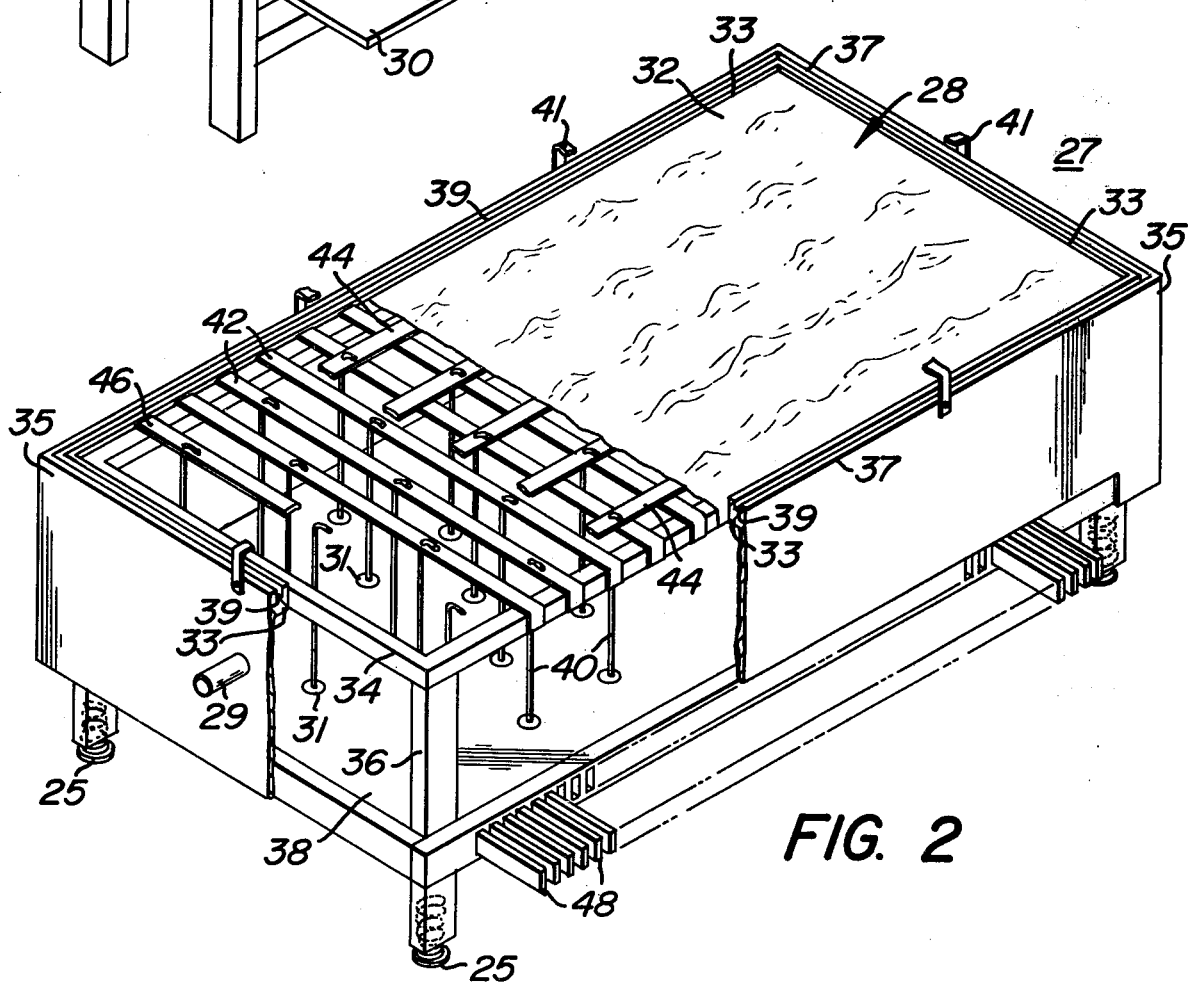
FIG. 2 is a perspective view in partial break-away illustrating the construction of the modified flexible platen apparatus situated in vacuum box.

With reference to FIG. 2, one embodiment of the flexible platen apparatus 28 comprises a flexible platen 32 which may be a suitable synthetic or natural rubber or plastic composition. An example of a suitable material is PUREGUM. The flexible platen 32 is attached peripherally to horizontal support member 34 by any acceptable means, and may be so attached in a relaxed state or slightly under tension. The elasticity of the flexible platen 32 must be sufficient to permit the vertical adjustment of the platen at a multiplicity of points as will be described. Vertical support members 36 support the horizontal support members 34 and also are used to position and support lower frame member 38 which may or may not be necessary, depending on the type of vertical adjustment means. Vertical adjustment rods 40 are positioned jointly by the lower frame member 38 and cross member strips 42 which may be relatively flexible elastic members which are secured to the horizontal support member 34. Additional cross strips 44 may be arranged perpendicularly to cross member strips 42 and are used to further stabilize the position of the upper portion of the vertical adjustment rods 40 which are secured to cross member strips 42 by their horizontally bent tops 46 or other suitable means. The flexible platen 32 may be secured to strips 42 and 44 by adhesive or other means. Adjustment levers 48, the purpose of which will be sebsequently described, extend from beneath the lower frame member 38 as shown in FIG. 2. It is to be clearly understood that the support means for the flexible platen 32 described above is by way of example only and that many suitable variations may be utilized with the important criterion being to enable the rapid, accurate adjustment of the platen 32 to desired positions which are retainable for a desired period of time.

The levers extend to each side of the flexible platen and are inclined in such a manner as to be readily accessible while the precise adjustment locations are an equal distance from one another. The vertical adjustment rods 40 extend upwardly to the flexible platen 32. As shown in FIG. 4, each adjustment lever 48 has a camming surface 50 to engage the vertical adjustment rod 40. The adjustment of the flexible platen 32 must be retainable, thus the camming function must be fixedly carried out with due consideration given to the downward force exerted by the stretched platen 32 as it is adjusted upwardly.

In place of the inclined levers and camming function, any other suitable purely mechanical scheme may be utilized. For example, gear trains or other suitable linkages are contemplated and the adjustment means may extend outwardly from the platen apparatus in layers rather than in inclined planar fashion as shown in FIG. 4. Worm gears and other turnably operated means are also contemplated.

In place of the mechanical adjustment operation disclosed in FIGS. 2 through 4a, an electromechanical adjustment system such as schematically disclosed in FIG. 5 of said co-pending application may be utilized. Control means 54 are shown which may be used to trigger standard pneumatic valves which are shown schematically as 56. Rods 40A are shown, however, which may be eliminated by placing the valve structure directly below the flexible platen 32.

Figure 10:
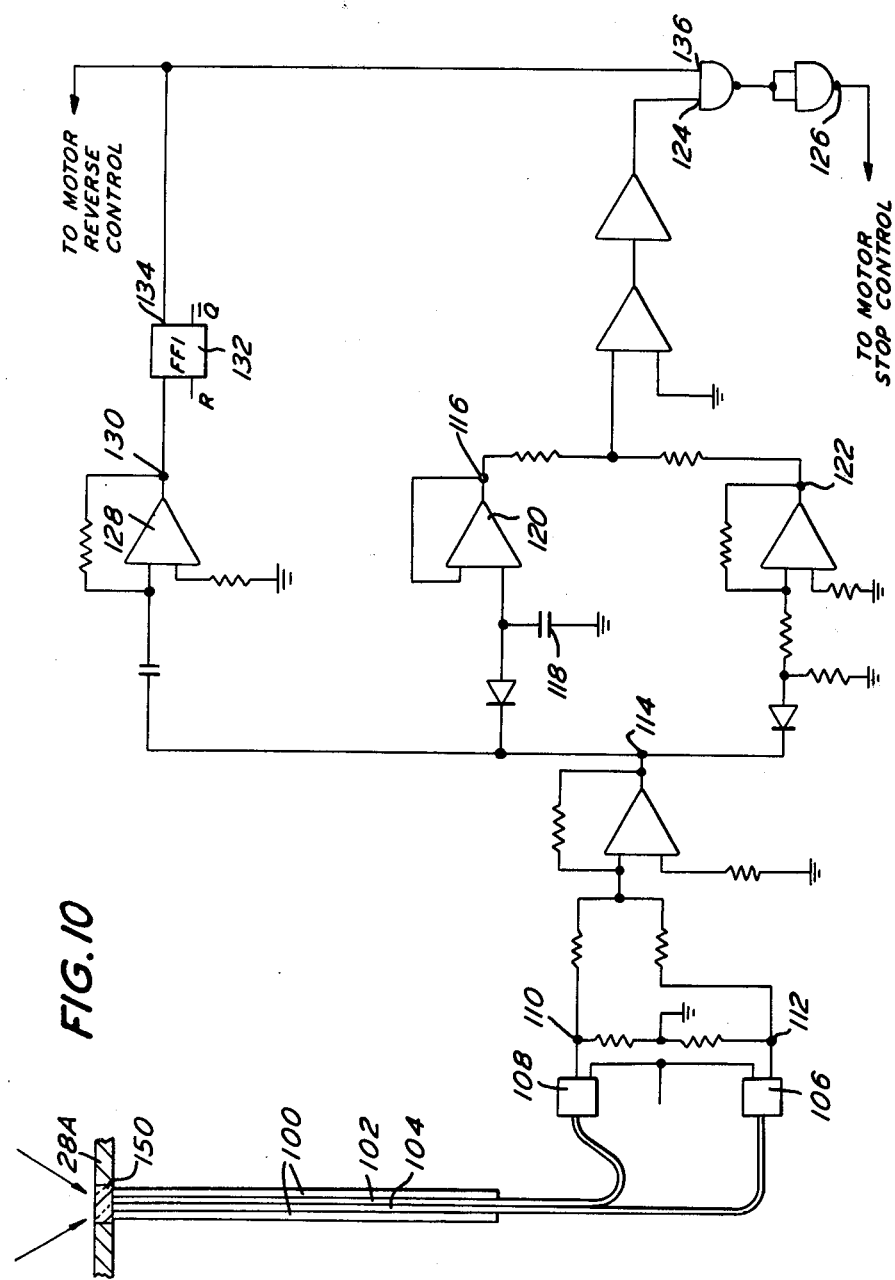
FIG. 10 is a schematic circuit diagram of fiber optic system which can be utilized to adjust the flexible platen; and, FIG. 11 is a side cross-sectional view of a portion of an alternative embodiment of the fiber optic system of FIG. 10.

With reference to FIG. 10, a fully automated platen adjustment means is shown in which fiber optic tubes and companion circuitry is used in place of the adjustment systems of FIGS. 4, 4A and 5. With the use of this fully automated system, the plotter operator does not have to observe the adjusting process and singularly adjust each of the series of rods 40, 40A or 40B until the requisit bluish-red combination is achieved. Rather, through the use of a power driven tube 100 containing a blue optical fiber 102 and a red optical fiber 104 and implementing circuitry, the bluish-red condition can be obtained at a multiplicity of points throughout a flexible platen. Thus, a flexible platen 28A of rubber-like material on the order of that disclosed in FIG. 1 is shown in FIG. 10. In place of each individual rod 40 as shown in FIG. 2, a motor driven tube 100 is utilized, each of which is controlled individually in the following manner.

Red light passes through fiber optic tube 104 with "Red" filter to photocell 106. Similarly, blue light passes through the fiber optic tube 102 with "Blue" filter to photocell 108.

Photocell 108 causes a voltage at terminal 110 proportional to the intensity of the blue light. Photocell 106 causes a voltage at terminal 112 proportional to the red light. These are summed, multiplied by a constant, and appear at terminal 114 as a negative voltage.

As the motor driven tube 100 is moved toward the apex or point of maximum intensity where the bluish-red condition is met, the voltage at terminal 114 will be increasing in magnitude. At the apex, this voltage is a maximum and will be stored at terminal 116. Capacitor 118 and amplifier 120 constitute a "maximum hold" circuit.

At this instant, the voltage of terminal 122 is also equal to that of terminal 116 so that the voltage at terminal 124 is essentially zero. This in turn assures that the voltage at terminal 126 will be zero.

As the motor drive tube 100 passes through the apex, the light intensity and consequently the voltage at terminal 114 will begin to decrease. This will cause two things to happen. First, the voltage at terminal 122 will decrease while that of terminal 116 will not. This in turn will cause a negative voltage to appear at terminal 124, but this will have no effect upon the voltage at terminal 126 which is already zero. Second, it will sense the positive slope of the voltage at terminal 114 and will cause differentiator 128 to have a negative output on terminal 130. This will in turn set flip-flop 132 causing a positive potential to appear at terminal 134. A positive signal is thus sent to terminal 136 and to a motor reversing control as shown.

When the motor (not shown) reverses, it will drive the movable tube 100 back toward the apex. As it does, the voltage at terminal 122 will increase and when it becomes very slightly larger than the voltage at the memory output terminal 116, the voltage at terminal 124 will reverse in polarity, and now since terminals 124 and 136 are both positive, terminal 126 will become positive sending a signal to the motor stop control. By this means, the motor driven tube 100 is positioned at the apex and will remain there.

A reset button (not shown) is needed to return the motor to its reset condition, reset flip flop 132 by applying an appropriate voltage to its R terminal, and discharge capacitor 118 by shorting it momentarily.

Thus, each motor driven tube 100, once actuated, will adjust itself to satisfy the bluish-red condition and accordingly, the entire flexible platen surface will assume the correct elevations to create a stereo model representative of the actual terrain.

In FIG. 10, above the motor driven tube 100, a transparent window 150, as contrasted to the platen 28A which is opaque, is utilized above the motor driven tube 100, which may or may not be attached thereto, to permit the projected light to reach the optical fibers 102, 104. A window 150 is provided for each tube 100.

Figure 11:
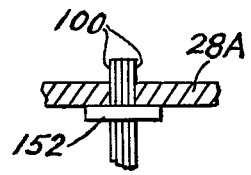

In an alternate embodiment, as shown in FIG. 11, the tubes 100 may penetrate through the opaque flexible platen 28A and be secured in place relative to the platen by rings 152.

With reference to FIG. 2, one embodiment of the modified flexible platen apparatus 28 comprises situating a flexible platen 32 inside of a vacuum box 27, from which virtually all of the air may be removed by suitable means. In this modification, the lower frame member 38 extends outwardly in all directions beyond the vertical support members 36 and is sealably connected to each of four vertical side members 35 which are sealably connected to one another at their individual points of joining. A top rim 37 is sealably connected to the upper edges of the four vertical side members 35.

The top rim 37 is of sufficient width to contain a slot 39 into which the lower frame 47 of the frame holder 43 may fit. The frame holder 43 is secured to the top rim by clamping means 41, located peripherally on the top rim 37.

A vacuum source connector valve 29 is sealably connected through one vertical side member 35 to provide an outlet for withdrawing air from within the vacuum box 27 by a suitable vacuum source (not shown).

Figure 3:
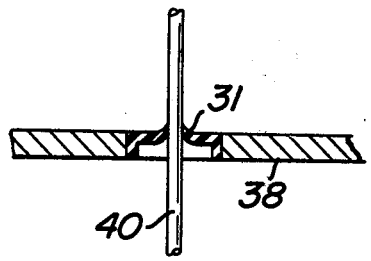
FIG. 3 is a section view of the air sealable grommet through which vertical adjustment rods pass through the lower support member.

Vertical support rods 40 are mounted through lower frame member 38 in air sealable grommets 31, as shown in FIG. 3.

The vacuum box 27 is supported by four vertically adjustable legs 25, which are utilized to keep the flexible platen 32 situated therein on a level plane during the modelling processes subsequently disclosed herein.

With reference to FIG. 5, the upper frame holder 43 consists of an upper frame 45 and a lower frame 47 attached to each other by hinged connector means 51. The lower surface of the upper frame 45 and the upper surface of the lower frame 47 are covered with a rubber gasket material 49 so that when a sheet of suitable material 61, the characteristics of which will be subsequently described, is placed between the upper frame 45 and the lower frame 47, and the two parts are closed about the hinged connector means 51, there will be an air seal between the upper and lower frames. The lower surface of the lower frame 47 of the frame holder 43 is also coated with a suitable rubber gasket material 49 so that when the frame holder 43 is attached to the top rim 37 in the slot 39 by frame holder clamping means 41, there is an air seal in slot 39. A suitable gasket material is natural rubber.

It is to be clearly understood that means of sealably connecting the frame holder 43 to the top rim 47 other than by a slot 39 as shown are available and the subject invention is not to be construed as being limited to this kind of sealing arrangement.

With reference to FIG. 6, a cover 55 is detachably connected to the top rim 37 of the vaccum box 27 after the frame holder 43 has been attached thereto. The cover contains a heating means, such as high resistance electric coils 57 capable of reaching a temperature of at least 300° F. The heating means is connected to a power source through power cord 59.

Prior to operation, the apparatus must be set up and this can be done with conventional plotting equipment or with modified equipment as disclosed in said copending application. By conventional means, such as a field survey, landmarks are located and the actual elevations are determined for preferably four physical locations. In additon, one horizontal distance between known points is necessary.

If using conventional equipment for the setup means and by using standard photogrammetric red and blue glasses with the use of a standard dot platen, the horizontal and vertical data is utilized in the standard manner to provide an absolute control model setup. This setup process is standard and various techniques are fully covered in volumes 1 and 2 of the Manual of Photogrammetry published by the American Society of Photogrammetry.

Once the flexible platen 32 is adjusted so that its surface provides an actual model-like three-dimensional photographic surface, several methods are available for producing permanent stereo relief models.

In one method, a soft fluid material is applied to the flexible platen 32 which material has the characteristic of being solidifiable whereby upon solidification, said material forms a permanent stereo relief model. An example of such a material is "Flexifoam", a polyurethane foam manufactured by Broadhead-Garrett Co.

In another method, with reference to FIG. 7, a sheet of flexible stretchable material 61, which material has the characteristic of becoming soft and conformable when heat is applied, and which retains any new shape assumed when said heat is removed, is placed between the upper and lower frames 45 and 47 of said frame holder 43. Two suitable materials are "Butycate Plastic", manufactured by Goodyear Tire and Rubber Company, and plexiglass "DR acrylic", manufactured by Rohm & Haas Company. The frame holder 43 is attached into the slot 39 of the top rim 37 by clamping means 41. The cover 55 is then placed over the frame holder 43 onto the top rim 37. A vacuum pump or other suitable means (not shown) is attached to the vacuum source connector valve 29 and activated. The heating means 57 in the cover 55 is then activated.

The material held in the frame holder 43 becomes soft and is pulled downward, both by gravitational force and by the pressure differential of the vacuum below the material 61 and normal air pressure above the material 61, onto the flexible platen 32, conforming and molding exactly to its shape. It is necessary for there to be some means of escape for the air which would be otherwise trapped between the flexible platen 32 and the material 61. In the presently preferred embodiment, the outer edges of the flexible platen 32 abut but are not attached to the inner edges of the top rim 37. Air flow means are provided through the resulting seam 33, noted in FIG. 2.

A second kind of air flow means can be accomplished by utilizing a porous or perforated material to make the flexible platen 32.

A third method would require drilling a series of holes or ports (not shown) through the horizontal support members 34 and through corresponding sections of the flexible platen. It will be appreciated by those skilled-in-the-art that other methods for providing air flow means through or around the flexible platen 32 are available and the present invention is not to be construed as being limited to those methods specifically set forth herein. The vacuum created in the vacuum box 27, of which the frame holder 43 and material 61 therein forms the top or lid by reason of the air flow means at seam 33, prevents air bubbles from being trapped between the material 61 and the flexible platen 32, which bubbles would cause distortions of the material. When the heating means 57 is deactivated, the material 61, now conformed to the shape of the flexible platen 32, hardens. When the vacuum source is deactivated, the cover 55 and frame holder 43 are removed, and the material 61, now in the shape of a permanent stereo relief map, is removed from the frame holder 43.

It will also be appreciated by those skilled-in-the art that instead of utilizing a vacuum below the flexible platen 32 and material 61, it is feasible to apply increased pressure to the upper surface of material 61, through the use of a pressurizing sealing cover. In fact, a closed system is possible wherein air removed from below the flexible platen is applied to increase the pressure above the material 61. In either method, vacuum from below or pressure from above, air flow means such as provided by seam 33 are necessary.

Another process involves the use of a material 61 which is not only stretchable and flexible and which has the characteristic of becoming soft and conformable when heat is applied, but which has been immersed in or has been coated with a photosensitive emulsion as well. If the emulsion is applied prior to molding, the process is the same as the foregoing but the steps must be completed under conditions which will not prematurely expose the photosensitized material, such as under the red safe-light used in photographic developing laboratories. The emulsion can also be applied after the molding process, so that only those steps after molding need be carried out under red safe-light conditions. Being more convenient, the latter method is presently preferred.

In this process, instead of removing the frame holder 43 after the heating means 57 and the vacuum means (not shown) have been disconnected, the vacuum box 27 is placed back into the stereo map plotter 10 and the images which were used to adjust the flexible platen 32 at the beginning of the process are re-exposed onto the photosensitive material for the proper amount of time. This material is removed from the frame holder 43 and developed in the normal fashion. In the case of geographical applications, the result is a stereo or three-dimensional map of the terrain photographed. Two suitable photosensitive emulsions are "PRINT-E-MULSION" manufactured by Rockland Colloid Corporation and "Temp Plate Emulsion" manufactured by GAF Corporation.

In still another method, a special paper is used, which paper is deformable when wet and which returns to a flat sheet when dry. The paper is coated with a suitable photosensitive emulsion, as above, and is draped over the previously adjusted flexible platen surface. When the paper is conformed to the shape of the platen, the images are re-exposed onto the material, as above. After the paper has been developed, it will dry into a flat, distortion-free map, which can be folded or stored like any ordinary map. In this method, use of the heating means 57 is obviated. Two suitable paper materials are "X crepe" paper manufactured by Cincinatti Industries, Inc. and "Wet-Strength" paper manufactured by The Crystal Tissue Company.

Figure 9:
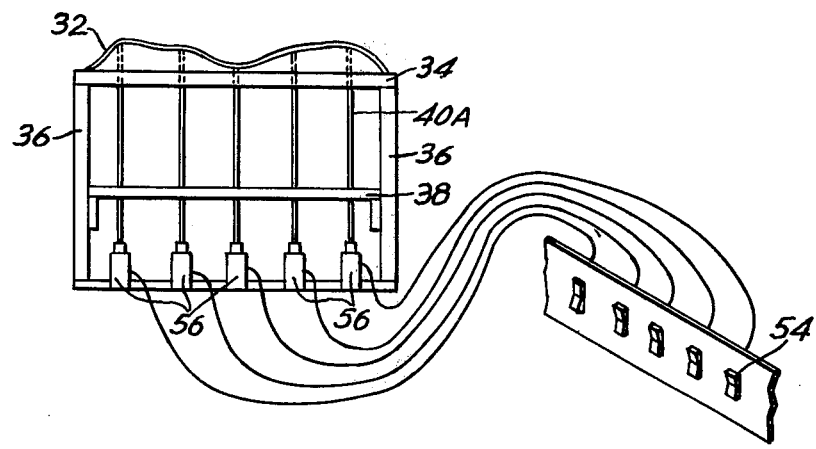
FIG. 9 illustrates electromechanical means for adjusting the various adjustment points of the flexible platen apparatus.

In other embodiments, fully disclosed in said co-pending application, where the adjustment means 65 of the flexible platen 32 are electromechanical or fully automated electronic means, such as that disclosed in FIG. 9 hereof, those means can be controlled by a computer system 63 shown in schematic form in FIG. 8. The computer system 63 can cause to be mapped upon the surface of the flexible platen 32 any mathematical function which plots one independent variable determinable by two independent variables.

The present invention may be embodied in other specific forms, including but not limited to all embodiments disclosed in said co-pending application, without departing from the spirit or essential attributes thereof and, accordingly, reference should be made to the appended claims rather than to the foregoing specification as indicating the scope of the invention.

I claim:

1. A method of producing an actual stereo relief model from a pair of diapositives showing the same subject matter from different angles comprising the steps of:
    illuminating and projecting a first image from one of said diapositives downward onto a flexible stretchable platen comprising a plurality of points vertically adjustable by means of adjustable elements engaging said flexible stretchable platen points;
    illuminating and projecting a second image of the same subject matter as the first image from the second of said diapositives downwardly onto said flexible platen;
    adjusting said plurality of points by manipulating said adjustable elements to cause said first and said second images to form one image at each of said plurality of points, thereby creating an actual stereo relief model of said subject matter as shown by said first and said second images.

2. The method of claim 1 further comprising the step of applying a soft fluid material to said flexible platen, which material has the characteristic of being solidifiable whereby upon solidification said material forms a permanent stereo relief model.

3. A method of producing an actual stereo relief model, from a pair of diapositives showing the same subject matter from different angles comprising the steps of:
    illuminating and projecting a first image from one of said diapositives downward onto a flexible stretchable platen comprising a plurality of points vertically adjustable by means of adjustable elements engaging said flexible stretchable platen, said flexible platen being situated in a vacuum box or container from which virtually all of the air may be removed, said flexible stretchable platen having air flow means there through or there around;
    illuminating and projecting a second image of the same subject matter as said first image from the second of said diapositives downwardly onto said flexible platen;
    adjusting said plurality of points by manipulating said adjustable elements to cause said first and said second images to form one image at each of said plurality of points, thereby creating an actual stereo relief model of said subject matter as shown by said first and said second images;
    sealably connecting a sheet of flexible stretchable material, which material has the characteristic of becoming soft and comformable when heat is applied, and which retains any new shape assumed when said heat is removed, onto said vacuum box, over said flexible platen;
    removing the air from said vacuum box; and
    heating said material for a sufficient amount of time for said material to become soft and to conform to the shape of said platen over which it was placed, thereby creating a permanent stereo relief model.

4. The method of claim 3, further comprising the steps of:
    placing said material between the upper and lower frames of a frame holder; and
    clamping said frame holder to said vacuum box.

5. The method of claim 3, further comprising the steps of:
    treating said conformed material with a photosensitizing emulsion;
    exposing the surface of said conformed, photosensitized material to said first image and said second image of said subject matter which are utilized to create said actual stereo model; and
    photographically developing said conformed, photosensitized, exposed material.

6. The method of claim 5, wherein said material is treated prior to molding and all said subsequent steps performed under suitable safelight conditions.

7. A method of producing an actual stereo relief model comprising the steps of:
    generating a mathematical function of one independent variable determinable by two independent variables and projecting said function onto a flexible stretchable platen comprising a plurality of points vertically adjustable by means of adjustable elements engaging said flexible stretchable platen; and adjusting said plurality of points by manipulating said adjustable elements to cause said function to be displayed in stereo relief on said platen, thereby creating an actual stereo relief model of said function.

8. The method of claim 7 further comprising the steps of applying a soft fluid material to said flexible platen, which material has the characteristic of solidifiable whereby upon solidification, said material forms a permanent stereo relief model.

9. The method of claim 7 further comprising the steps of:

placing a sheet of flexible stretchable material, which material has the characteristic of becoming soft and conformable when heat is applied, and which retains any new shape assumed when said heat is removed, between the upper and lower frames of said frame holder, and clamping said frame holder to said vacuum box;

clamping said cover with said heating means over said frame holder onto said vacuum box;

removing the air from said vacuum box; and applying heat from said heating means for a sufficient amount of time for said material to become soft and to conform to the shape of said platen over which it was placed, thereby creating a permanent stereo relief model.

10. A method of producing an actual stereo relief model from a pair of diapositives showing the same subject matter from different angles comprising the steps of:

illuminating and projecting a first image from one of said diapositives downward onto a flexible stretchable platen comprising a plurality of points vertically adjustable by means of adjustable elements engaging said flexible stretchable platen, said flexible stretchable platen being situated in a container from which air may escape; said flexible stretchable platen having air flow means there through or there around;

illuminating and projecting a second image of the same subject matter as said first image from the second of said diapositives downwardly onto said flexible platen;

adjusting said plurality of points by manipulating said adjustable elements to cause said first and second images to form one image at each of said plurality of points, thereby creating an actual stereo relief model of said subject matter as shown by said first and said second images;

sealably connecting a sheet of flexible stretchable material, which material has the characteristic of becoming soft and conformable when heat is applied, and which retains any new shape assumed when said heat is removed, onto said container over said flexible platen;

applying increased air pressure to the upper surface of said material; and, heating said material for a sufficient amount of time for said material to become soft and to conform to the shape of said platen over which it was placed, thereby creating a permanent stereo relief model.

11. The method of claim 10, further comprising the steps of:

placing said material between the upper and lower frames of a frame holder; and clamping said frame holder to said container.

12. The method of claim 10, further comprising the steps of: treating said conformed material with a photosensitizing agent;

exposing the surface of said conformed, photosensitized material to said first image and said second image of said subject matter which are utilized to create such actual stereo model; and photographically developing said conformed, photosensitized, exposed material.

13. The method of claim 12, wherein said material is treated prior to molding and all subsequent steps performed under suitable safelight conditions.

14. A method of producing a photogrammetric product from a pair of diapositives showing the same subject matter from different angles, comprising the steps of:

illuminating and projecting a first image from one of said diapositves downward onto a flexible stretchable platen comprising a plurality of points vertically adjustable by means of adjustable elements engaging said flexible stretchable platen;

illuminating and projecting a second image of the same subject matter as said first image from the second of said diapositives downwardly onto said flexible stretchable platen;

adjusting said plurality of points by manipulating said adjustable elements to cause said first and second images to form one image at each of said plurality of points, thereby creating an actual stereo relief model of said subject matter as shown by said first and second images;

applying material which will conform to said flexible platen; and, treating said material to produce said photogrammetric product.

15. The method of claim 14, wherein said material is a soft fluid having the characteristic of being solidifiable after application thereof, and said treating comprises allowing said material to solidify, harden, or dry.

16. The method of claim 14, wherein said material is a flexible, stretchable sheet having the characteristic of becoming soft and conformable when heat is applied thereto, and which retains any new shape assumed when said heat is removed;

wherein said applying is accomplished by sealably connecting said sheet onto a vacuum box, over said flexible platen; and, wherein said treating comprises the steps of removing the air from said vacuum box and treating said material for a sufficient amount of time for said material to become soft and to conform to the shape of said flexible platen.

17. The method of claim 16, wherein said treating further comprises the steps of coating said conformed material with a photosensitizing emulsion, exposing said conformed, photosensitized material to said first image and said second image of said subject matter, and photographically developing said conformed, photosensitized exposed material.

18. The method of claim 14, wherein said material is a flexible sheet of paper having the characteristic of stretching and being conformable when wet, and which returns to its original flat shape when dry, and wherein said treating comprises the steps of wetting said sheet with a photosensitizing emulsion, allowing said wet material to conform to the shape of said flexible platen, exposing said conformed, photosensitized material to said first and said second image of said subject matter and photographically developing said conformed, photosensitized exposed material.

* * * * *